United States Patent
Hedrick

(10) Patent No.: US 7,022,221 B1
(45) Date of Patent: Apr. 4, 2006

(54) STRIPPING APPARATUS AND PROCESS

(75) Inventor: Brian W. Hedrick, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 573 days.

(21) Appl. No.: 10/223,335

(22) Filed: Aug. 16, 2002

(51) Int. Cl.
*B01J 38/00* (2006.01)

(52) U.S. Cl. .................. 208/150; 422/144; 34/171; 34/174

(58) Field of Classification Search ............. 208/150; 34/171, 174; 422/144
See application file for complete search history.

(56) References Cited

U.S. PATENT DOCUMENTS

| | | | |
|---|---|---|---|
| 2,440,620 A | 4/1948 | Taff ........................... 23/288 |
| 2,472,502 A * | 6/1949 | Tyson ........................ 422/144 |
| 2,541,801 A | 2/1951 | Wilcox ........................ 196/52 |
| 2,545,165 A * | 3/1951 | Ogorzaly .................... 422/145 |
| 2,612,438 A | 9/1952 | Murphree .................... 23/288 |
| 2,994,659 A | 8/1961 | Slyngstad et al. .......... 208/113 |
| 3,894,932 A | 7/1975 | Owen .......................... 208/74 |
| 4,220,623 A | 9/1980 | Jahnke et al. .............. 422/144 |
| 4,364,905 A | 12/1982 | Fahrig et al. ............... 422/144 |
| 4,414,100 A | 11/1983 | Krug et al. ................. 208/153 |
| 4,419,221 A | 12/1983 | Castagnos, Jr. et al. .... 208/113 |
| 4,431,749 A | 2/1984 | Hettinger, Jr. et al. ....... 502/68 |
| 4,481,103 A | 11/1984 | Krambeck et al. .......... 208/120 |
| 4,500,423 A | 2/1985 | Krug et al. ................. 208/161 |
| 4,541,922 A | 9/1985 | Lomas et al. .............. 208/164 |
| 4,541,923 A | 9/1985 | Lomas et al. .............. 208/164 |
| 5,136,791 A * | 8/1992 | Fraile et al. .................. 34/586 |
| 5,531,884 A | 7/1996 | Johnson et al. ............ 208/150 |
| 5,549,814 A | 8/1996 | Zinke ......................... 208/150 |
| 5,910,240 A | 6/1999 | Senior et al. .............. 208/113 |
| 2001/0027938 A1 | 10/2001 | Koebel et al. ............. 208/150 |
| 2002/0008052 A1 | 1/2002 | Hedrick ...................... 208/113 |

FOREIGN PATENT DOCUMENTS

WO   WO 91/00899   1/1991

* cited by examiner

*Primary Examiner*—Walter D. Griffin
(74) *Attorney, Agent, or Firm*—John G. Tolomei; James C. Paschall

(57) ABSTRACT

An FCC apparatus uses a cantilevered support for supporting baffles in a stripping vessel. Only one end of the support is fastened to a wall of a contacting conduit or a wall of the stripping vessel and the other end is spaced apart from the near wall of the contacting conduit or the stripping vessel. The arrangement provides for easier maintenance and accommodates differential thermal expansion.

20 Claims, 4 Drawing Sheets

STRIPPING APPARATUS AND PROCESS

BACKGROUND OF THE INVENTION

This invention relates to apparatuses for the fluidized contacting of catalyst with hydrocarbons. More specifically, this invention relates to apparatuses for stripping entrained or adsorbed hydrocarbons from catalyst particles.

DESCRIPTION OF THE PRIOR ART

A variety of processes contact finely divided particulate material with a hydrocarbon containing feed under conditions wherein a fluid maintains the particles in a fluidized condition to effect transport of the solid particles to different stages of the process. Fluidized catalytic cracking (FCC) is a prime example of such a process that contacts hydrocarbons in a reaction zone with a catalyst composed of finely divided particulate material.

An FCC process unit comprises a reaction zone and a catalyst regeneration zone. In the reaction zone, a feed stream is contacted with finely divided fluidized solid particles or catalyst maintained at an elevated temperature and at a moderate positive pressure. Contacting of feed and catalyst usually takes place in a riser conduit, but may occur in any effective arrangement such as the known devices for short contact time contacting. In the case of a riser, a principally vertical conduit comprises the main reaction site, with the effluent of the conduit emptying into a large volume process vessel, which is called the reactor vessel or may be referred to as a separation vessel. The residence time of catalyst and hydrocarbons in the riser needed for substantial completion of the cracking reactions is only a few seconds or less. The flowing vapor/catalyst stream leaving the riser may pass from the riser to a solids-vapor separation device located within the separation vessel or may enter the separation vessel directly without passing through an intermediate separation apparatus. When no intermediate apparatus is provided, much of the catalyst drops out of the flowing vapor/catalyst stream as the stream leaves the riser and enters the separation vessel. One or more additional solids/vapor separation devices, almost invariably a cyclone separator, is normally located within and at the top of the large separation vessel. The products of the reaction are separated from a portion of catalyst which is still carried by the vapor stream by means of the cyclone or cyclones and the vapor is vented from the cyclone and separation vessel. The spent catalyst falls downward to a lower location within the separation vessel. As used herein, the term "spent catalyst" is intended to indicate catalyst employed in the reaction zone which is being transferred to the regeneration zone for the removal of coke deposits. The term is not intended to be indicative of a total lack of catalytic activity by the catalyst particles. The term "used catalyst" is intended to have the same meaning as the term "spent catalyst".

Catalyst is continuously circulated from the reaction zone to the regeneration zone and then again to the reaction zone. The catalyst therefore acts as a vehicle for the transfer of heat from zone to zone as well as providing the necessary catalytic activity. Any FCC catalyst can be used in the process. The particles will typically have a size of less than 100 microns. Catalyst which is being withdrawn from the regeneration zone is referred to as "regenerated" catalyst. The catalyst charged to the regeneration zone is brought into contact with an oxygen-containing gas such as air or oxygen-enriched air under conditions which result in combustion of the coke. This results in an increase in the temperature of the catalyst and the generation of a large amount of hot gas which is removed from the regeneration zone as a gas stream referred to as a flue gas stream. The regeneration zone is normally operated at a temperature of from about 600° C. (1112° F.) to about 800° C. (1472° F.). Additional information on the operation of FCC reaction and regeneration zones may be obtained from U.S. Pat. No. 4,541,922, U.S. Pat. No. 4,541,923, U.S. Pat. No. 4,431,749, U.S. Pat. No. 4,419,221 and U.S. Pat. No. 4,220,623.

A majority of the hydrocarbon vapors that contact the catalyst in the reaction zone are separated from the solid particles by ballistic and/or centrifugal separation methods within the reaction zone. However, the catalyst particles employed in an FCC process have a large surface area, which is due to a great multitude of pores located in the particles. As a result, the catalytic materials retain hydrocarbons within their pores, upon the external surface of the catalyst and in the spaces between individual catalyst particles as they enter the stripping zone. Although the quantity of hydrocarbons retained on each individual catalyst particle is very small, the large amount of catalyst and the high catalyst circulation rate which is typically used in a modern FCC process results in a significant quantity of hydrocarbons being withdrawn from the reaction zone with the catalyst.

Therefore, it is common practice to remove, or strip, hydrocarbons from spent catalyst prior to passing it into the regeneration zone. Greater concentrations of hydrocarbons on the spent catalyst that enters the regenerator increase its relative carbon-burning load and result in hotter regenerator temperatures. Avoiding the unnecessary burning of hydrocarbons is especially important during the processing of heavy (relatively high molecular weight) feedstocks, since processing these feedstocks increases the deposition of coke on the catalyst during the reaction, in comparison to the coking rate with light feedstocks, and raises the temperature in the regeneration zone. Improved stripping permits cooler regenerator temperatures and higher conversion.

The most common method of stripping the spent catalyst includes passing a stripping gas, usually steam, through a flowing stream of catalyst, counter-current to its direction of flow. Such steam stripping operations, with varying degrees of efficiency, remove the hydrocarbon vapors which are entrained with the catalyst and adsorbed on the catalyst. Contact of the catalyst with a stripping medium may be accomplished in a simple open vessel as demonstrated by U.S. Pat. No. 4,481,103.

The efficiency of catalyst stripping is increased by using vertically spaced baffles to cascade the catalyst from side to side as it moves down a stripping apparatus and counter-currently contacts a stripping medium. Moving the catalyst horizontally increases contact between the catalyst and the stripping medium so that more hydrocarbons are removed from the catalyst. In these arrangements, the catalyst is given a labyrinthine path through a series of baffles located at different levels. Catalyst and gas contact is increased by this arrangement that leaves substantially no open vertical path of significant cross-section through the stripping apparatus. Further examples of these stripping devices for FCC units are shown in U.S. Pat. No. 2,440,620, U.S. Pat. No. 2,612,438, U.S. Pat. No. 3,894,932, U.S. Pat. No. 4,414,100 and U.S. Pat. No. 4,364,905. These references show the typical stripping vessel arrangement having a stripping vessel, a series of outer baffles in the form of frusto-conical sections that direct the catalyst inwardly onto a series of inner baffles. The inner baffles are centrally located conical or frusto-conical sections supported on a reactor riser that ascends through the stripping vessel. The inner baffle diverts the catalyst outwardly onto the outer baffles and vice versa to promote horizontal movement. The stripping medium enters from below the lower baffles and continues rising upwardly from the bottom of one baffle to the bottom of the next succeeding baffle. Variations in the baffles include the addition of skirts about the trailing edge of the baffle as depicted in U.S. Pat. No. 2,994,659 and the use of multiple linear baffle sections at different baffle levels as demonstrated in FIG. 3 of U.S. Pat. No. 4,500,423. A variation in introducing the stripping medium is shown in U.S. Pat. No. 2,541,801 where a quantity of fluidizing gas is admitted at a number of discrete locations. U.S. Pat. No. 5,531,884 shows a modification to a baffle-style stripping vessel that incorporates one or more large vertical conduits in the baffle to provide an additional catalyst and gas circulation path through the baffles. It is also known to concentrate openings in a very centralized portion of the stripping baffles.

Baffles in stripping vessels for FCC units are typically oriented to have an angle of 45° with respect to the horizontal. The sloped baffles assure that catalyst moves off the tray down to the next level in the stripping vessel to assure movement with a horizontal component. However, because the sloped trays each occupy substantial elevation, they limit the number of trays that can be installed in a given height of a stripping vessel. The greater the number of trays in the stripping vessel, the greater the overall performance. On the other hand, setting baffles at a smaller slope will result in catalyst accumulation on top of the baffle unless fluidization over the baffle is increased, which could require increasing the flow rate of stripping medium. U.S. 2002/0008052 A1 discloses a thoroughly fluidized stripping baffle.

U.S. Pat. No. 5,910,240 discloses frustoconical stripping baffles that include vanes configured to impart rotational movement to descending catalyst. U.S. Pat. No. 5,549,814 discloses a stripping vessel with layers of inverted U-shaped grids radially extending from an internal riser. Perforations in the legs of the "U" allow passage of stripping media.

WO 91/00899 discloses a stripping vessel with perforated horizontal trays. The fluidization in the stripping vessel is such that the catalyst descends from one tray to another substantially only through downcomer sections of respective trays. The catalyst material forms a dense bed upon the top surface of each tray without substantial quantities of catalyst weeping through the perforations in the tray. This reference also teaches the use of deflector plates above downcomers that are vertically aligned at the center of an annular tray and trays comprising wire mesh or arrays of bars. U.S. 2001/0027938 A1 teaches horizontal baffles, as well.

Baffles in a stripping vessel are typically welded directly to the wall of the stripping vessel. In stripping vessels with an internal reactor riser ascending through the central region of the stripping vessel, outer frusto-conical baffles are welded directly to the inner wall of the shell of the stripping vessel while inner frusto-conical baffles are welded directly to the outer wall of the internal riser.

Maintaining baffles that are directly welded to the shell or internal riser of the stripping vessel presents difficulty. To service or maintain the baffles, the weld of the baffle to the riser wall or vessel shell must be broken before the baffle can be removed. After maintenance, the baffle must be re-welded to the shell or wall of the internal riser. Additionally, the weld must be subjected to heat treatment to relieve the weld of stress generated during the welding process. Frequently, stripping vessels include refractory material adhered to the inner wall of the shell and/or to the outer wall of the internal riser. In such situations, the refractory material must be broken around the weld to access the weld and remove the baffle. The refractory material must be reapplied once the baffle is reinstalled and welded to the shell of the vessel or to the wall of the riser.

An FCC reaction process is endothermic with hot regenerated catalyst providing the heat of reaction. The catalyst and hydrocarbons are relatively hotter earlier in the process and relatively cooler later in the process. Hence, the wall of the riser is hotter than the wall of the stripping vessel. Consequently, the wall of the stripping vessel expands radially and axially to a lesser degree than the wall of the riser. Moreover, when the walls of the stripping vessel and the riser are covered with refractory material, the stripping vessel is insulated from the hotter riser. The wall of the stripping vessel expands to an even lesser degree than the wall of the riser. Moreover, the metal baffles within the stripping vessel may expand radially more than the wall of the vessel because it is located closer to the wall of the riser. These expansion differentials must be accounted for in the design and, if not, can put further stress on the weld joint or other securement means which may require further maintenance on the stripping vessel with attendant unproductive down-time.

BRIEF SUMMARY OF THE INVENTION

The present invention is a new cantilevered support for supporting baffles in a stripping vessel. Only one end of the support is fastened to a wall of a contacting conduit or a wall of the stripping vessel and the other end is spaced apart from the near wall of the contacting conduit or the stripping vessel. The arrangement provides for easier maintenance and accommodates differential thermal expansion.

In an embodiment, the present invention comprises an apparatus for the stripping of entrained and/or adsorbed hydrocarbons from particulate material. The apparatus comprises a stripping vessel defined by at least a vessel wall. A pipe having an outer wall extends through the stripping vessel. A port defined by the stripping vessel receives particles that contain entrained or adsorbed hydrocarbons into the stripping vessel. A fluid inlet passes a stripping fluid into the stripping vessel to strip hydrocarbons from the particulate material. A particle outlet provides for recovering stripped particles from the stripping vessel. A plurality of stripping baffles are spaced apart vertically over at least a portion of the stripping vessel. Lastly, a cantilevered support structure fastened to the vessel wall or the outer wall supports one of the stripping baffles.

In another embodiment, the cantilevered support structure has a first end fastened to the vessel wall or the outer wall and a second end spaced apart from the other of the vessel wall or the outer wall, the support structure supporting one of the stripping baffles.

In a further embodiment, the cantilevered support structure includes a circumferential band at a first end of the cantilevered support structure. The circumferential band is fastened to the vessel wall or the outer wall. One of the stripping baffles has a first edge supported on the circumferential band and a second edge supported on a second end of the cantilevered support structure.

Accordingly, it is an object of this invention to provide an easily maintained support for baffles in a stripping vessel.

Additional objects, embodiments and details of this invention are given in the following detailed description of the invention.

DETAILED DESCRIPTION OF THE INVENTION

Figure 1:
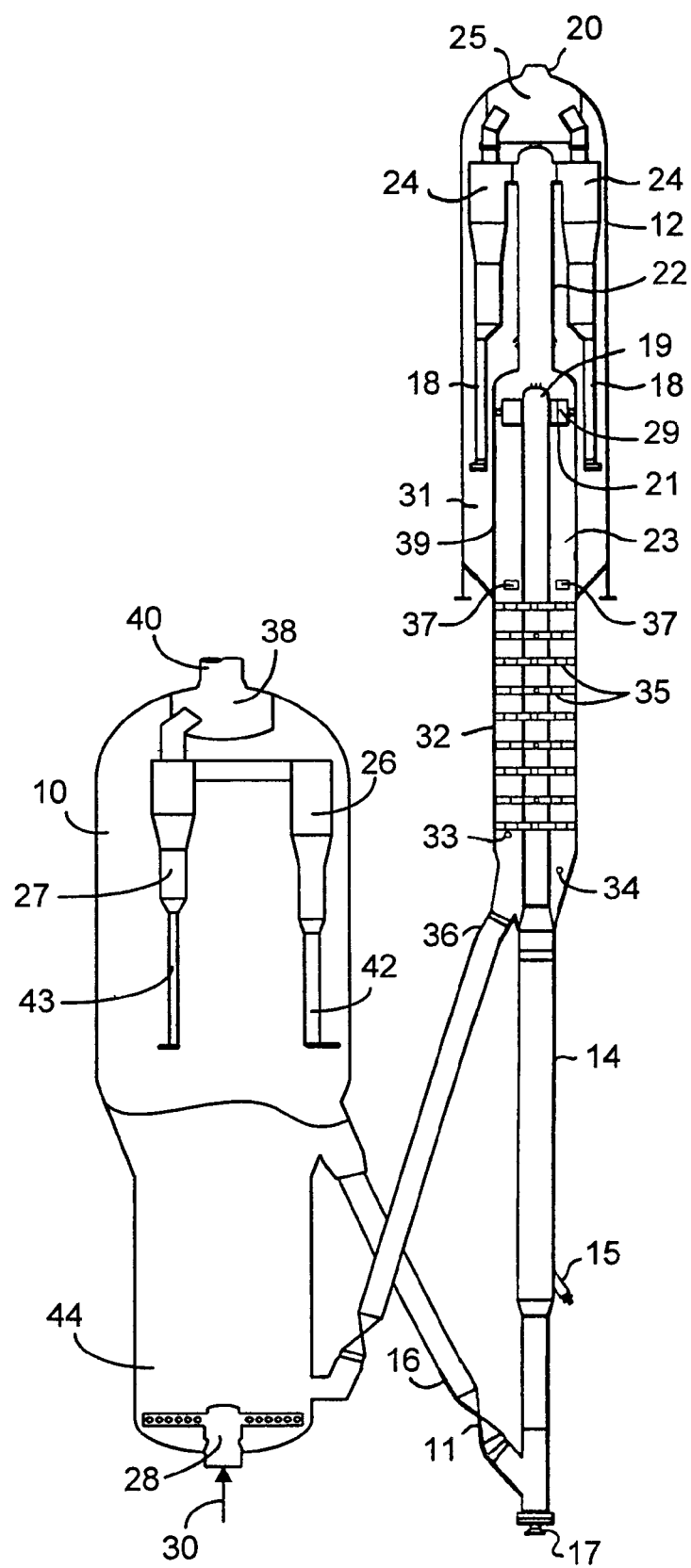
FIG. 1 is a schematic elevational view of an FCC reactor of the present invention.

Looking first at more details of an FCC process in which the present invention may be used, the typical feed to an FCC unit is a gas oil such as a light or vacuum gas oil. Other petroleum-derived feed streams to an FCC unit may comprise a diesel boiling range mixture of hydrocarbons or heavier hydrocarbons such as reduced crude oils. It is preferred that the feed stream consist of a mixture of hydrocarbons having boiling points, as determined by the appropriate ASTM test method, above about 230° C. (446° F.) and more preferably above about 290° C. (554° F.). It is becoming customary to refer to FCC-type units which are processing heavier feedstocks, such as atmospheric reduced crudes, as residual crude cracking units, or resid cracking units. The apparatus of this invention can be used for either FCC or residual cracking operations. For convenience, the remainder of this specification will only make reference to the FCC apparatus.

The reaction zone of an FCC process, which is normally referred to as a "riser" due to the widespread use of a vertical tubular conduit or pipe, is maintained at high temperature conditions which generally include a temperature above about 425° C. (797° F.). Preferably, the reaction zone is maintained at cracking conditions which include a temperature of from about 480° to about 590° C. (896° to 1094° F.) and a pressure of from about 65 to about 500 kPa (9.4 to 72.5 psia) but preferably less than about 275 kPa (39.9 psia). The catalyst-to-oil ratio, based on the weight of catalyst and feed hydrocarbons entering the bottom of the riser, may range up to 20:1 but is preferably between about 4:1 and about 10:1. Hydrogen is not normally added to the riser, although hydrogen addition is known in the art. On occasion, steam may be passed into the riser. The average residence time of catalyst in the riser is preferably less than about 5 seconds. The type of catalyst employed in the process may be chosen from a variety of commercially available catalysts. A catalyst comprising a zeolite base material is preferred, but the older style amorphous catalyst can be used if desired.

The catalyst regeneration zone is preferably operated at a pressure of from about 35 to about 500 kPa (5.1 to 72.5 psia). The spent catalyst being charged to the regeneration zone may contain from about 0.2 to about 15 wt-% coke. This coke is predominantly comprised of carbon and can contain from about 3 to about 12 wt-% hydrogen, as well as sulfur and other elements. The oxidation of coke will produce the common combustion products: water, carbon oxides, sulfur oxides and nitrous oxides. As known to those skilled in the art, the regeneration zone may take several configurations, with regeneration being performed in one or more stages. Further variety is possible due to the fact that regeneration may be accomplished with the fluidized catalyst being present as either a dilute phase or a dense phase within the regeneration zone. The term "dilute phase" is intended to indicate a catalyst/gas mixture having a density of less than 300 kg/m$^3$ (18.7 lb/ft$^3$). In a similar manner, the term "dense phase" is intended to mean that the catalyst/gas mixture has a density equal to or more than 300 kg/m$^3$ (18.7 lb/ft$^3$). Representative dilute phase operating conditions often include a catalyst/gas mixture having a density of about 15 to about 150 kg/m$^3$ (0.9 to 9.4 lb/ft$^3$).

FIG. 1 shows an FCC unit that uses a concentric riser and stripping vessel. A regenerator standpipe 16 transfers catalyst from a regenerator 10 at a rate regulated by a slide valve 11. A fluidization medium from a nozzle 17 transports catalyst upwardly through a riser 14 at a relatively high density until a plurality of feed injection nozzles 15 (only one is shown) inject feed across the flowing stream of catalyst particles. The resulting mixture continues upward through the riser 14 until a pair of disengaging arms 21 tangentially discharge the mixture of gas and catalyst from a top 19 of the riser 14 through ports 29 into a disengaging vessel 23 that effects separation of gases from the catalyst. A transport conduit 22 carries the hydrocarbon vapors, including stripped hydrocarbons, stripping media and entrained catalyst to one or more cyclones 24 in a separator vessel 12 which separates spent catalyst from the hydrocarbon vapor stream. A collection chamber 25 in the separator vessel 12 gathers the separated hydrocarbon vapor streams from the cyclones 24 for passage to an outlet nozzle 20 and eventually into a fractionation zone (not shown). Diplegs 18 discharge catalyst from the cyclones 24 into a lower portion of the separator vessel 12 in a collection space 31 that eventually passes the catalyst and adsorbed or entrained hydrocarbons into a stripping section 32 across ports 37 defined in a wall 39 of the disengaging vessel 23. Catalyst separated in the disengaging vessel 23 passes directly into the stripping section 32. Because the disengaging vessel 23 includes the stripping section 32, it can also be referred to as a stripping vessel. The stripping section 32 contains baffles 35 to promote contact and mixing between a stripping gas and the catalyst. The baffles are shown to be horizontal, but they may take other configurations, such as a frusto-conical shape. The stripping gas enters a lower portion of the stripping section 32 through inlets 33, 34. The inlets 33, 34 may supply the stripping gas to one or more distributors (not shown) that distribute the gas around the circumference of the baffles 35. The spent catalyst leaves the stripping section 32 through a reactor conduit 36 and passes into the regenerator 10.

Regeneration gas, such as compressed air, enters the regenerator 10 through a conduit 30. An air distributor 28 disperses air over the cross-section of the regenerator 10 where it contacts spent catalyst. Coke is removed from the catalyst by combustion with oxygen from the air distributor 28. Combustion by-products and unreacted air components rise upwardly along with entrained catalyst through the regenerator 10 into the inlets of cyclones 26, 27. Relatively catalyst-free gas collects in an internal chamber 38 which communicates with a gas outlet 40 that removes spent regeneration gas from the regenerator 10. Catalyst separated by the cyclones 26, 27 drops through discharge legs 42, 43 and returns to a bed 44 in the lower portion of the regenerator 10.

Figure 2:
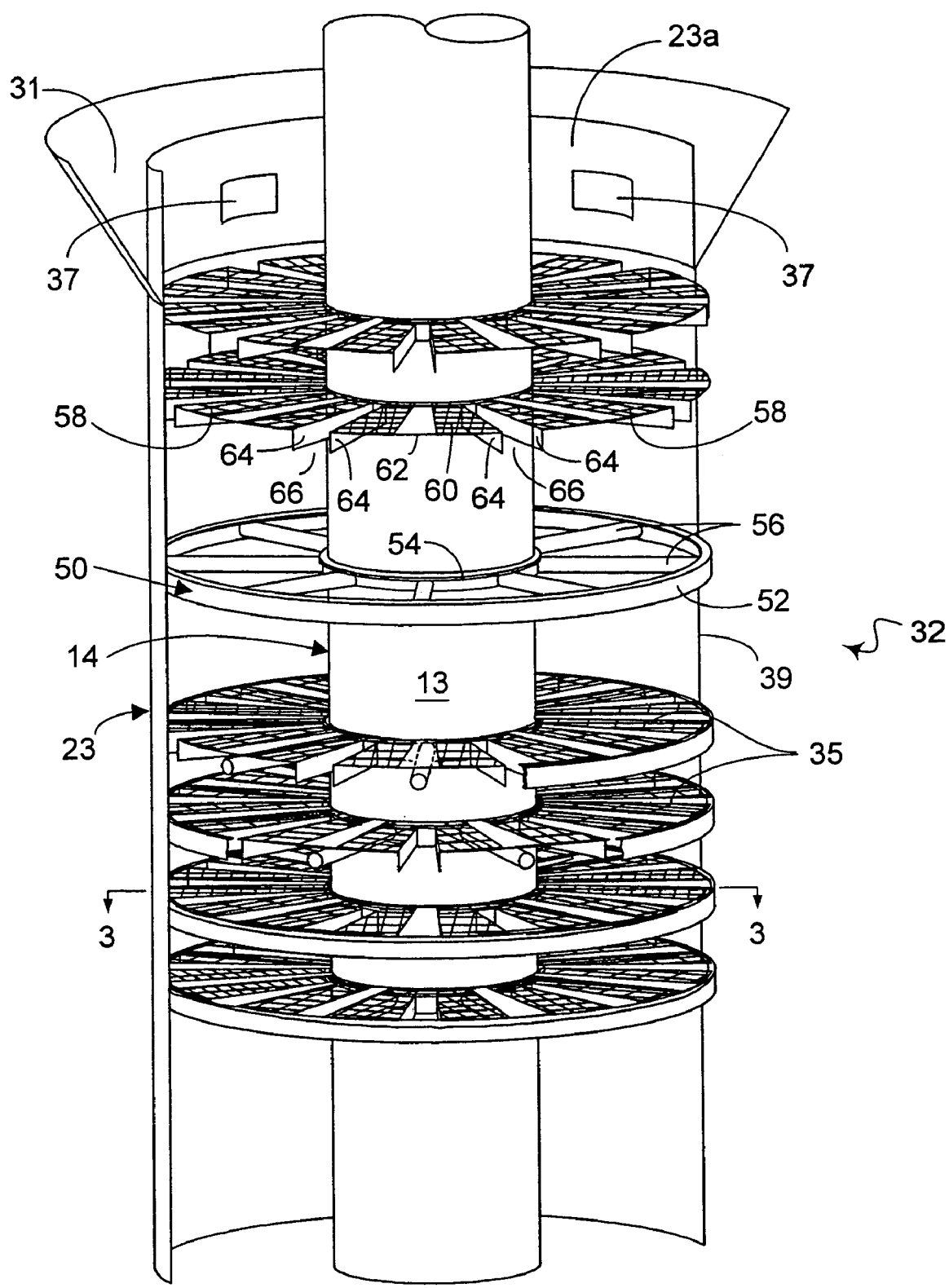
FIG. 2 is an enlarged, partial perspective view of a stripping section of the present invention shown in FIG. 1.

FIG. 2 depicts an enlarged, partial, perspective view of the stripping section 32 of FIG. 1. Parts of FIG. 2 are excluded or broken away to fully illustrate the stripping section 32 of the present invention. Spent catalyst enters the stripping section 32 either through a top 23a of the disengaging vessel 23 or through the ports 37 from the collection space 31. Stripped hydrocarbon and stripping medium exit through the top of the disengaging vessel 23. Each baffle 35 is supported in the stripping section 32 by a cantilevered support structure 50. The cantilevered support structure 50 may comprise an outer circumferential band 52 and an inner circumferential band 54. The outer circumferential band 52 is connected to the inner circumferential band 54 by elongated bars or spokes 56 that radiate from the inner circumferential band 54 to the outer circumferential band 52. Each respective end of the spokes 56 are secured to the outer circumferential band 52 and the inner circumferential band 54. Either the outer circumferential band 52 is fastened to the wall 39 of the disengaging vessel 23 which contains the stripping section 32 or the inner circumferential band 54 is fastened to an outer wall 13 of the riser 14 extending up through the stripping section 32 and the rest of the disengaging vessel 23. Only the outer circumferential band 52 or the inner circumferential band 54 that is not fastened to a wall is spaced apart from the proximate opposing wall 39, 13 and not affixed thereto to allow for thermal expansion. The circumferential band 52, 54 that is fastened to the respective walls 39, 13 may be fastened by any suitable means known in the FCC art such as welding or bolting to the respective surfaces. In an embodiment that does not include an internal riser within the stripping section 32, spokes may extend diametrically across the outer circumferential band 52, and only one end of each spoke 56 may be fastened to the outer circumferential band 52. The other end of the spoke 56 would be spaced from the wall 39 and allowed to slide with respect to the outer circumferential band 52. This embodiment would obviate the need for the inner circumferential band 54.

Each baffle 35 comprises several sectors comprising a perforated section 60 and an imperforate section 62. The perforated section 60 can be comprised of circular openings in a plate or can comprise a grating. In an embodiment, the openings in the baffle are large enough to allow catalyst particles to pass therethrough. The imperforate section 62 could be a portion of the plate comprising a baffle sector 58 that has no openings therein or it may comprise an imperforate plate laid over the perforated section 60 of the baffle sector 58. Each lateral edge of the baffle sector 58 may include a skirt wall 64 depending downwardly therefrom. In an embodiment, all adjacent baffle sectors 58 are spaced apart typically by consistent degrees, and adjacent edges of adjacent baffle sectors 58 define downcomers or downcomer sections 66. Adjacent baffles 35 are arranged along the height of the stripping section 32 with alternating orientations. Hence, the downcomer section 66 of a superjacent baffle 35 is vertically aligned with the imperforate section 62 of a subjacent baffle 35. This arrangement of aligning the downcomer section 66 and the imperforate section 62 and offsetting of the downcomer sections 66 of the adjacent baffles 35 assures horizontal movement of catalyst across the surface of the baffles 35 and particularly across the baffle sectors 58. Although catalyst falls through the openings in the perforated section 60 of each baffle sector 58, most of the catalyst falls through the downcomer section 66. Hence, the perforated plate aligned vertically with the downcomer sections 66 of the superjacent baffle 35 prevents catalyst from falling vertically straight through all of the baffle sections without undergoing horizontal movement.

In an embodiment, the height of the separation between each succeeding tray is between 31 and 76 cm (12 and 30 inches) apart. In another embodiment, the height of separation between succeeding trays is 61 cm (24 inches) apart but it may also be preferable to reduce the height to 46 cm (18 inches) apart to pack more baffles into the stripping section 32. If all the baffles 35 were shown in FIG. 2, nine baffles 35 would be provided.

Figure 3:
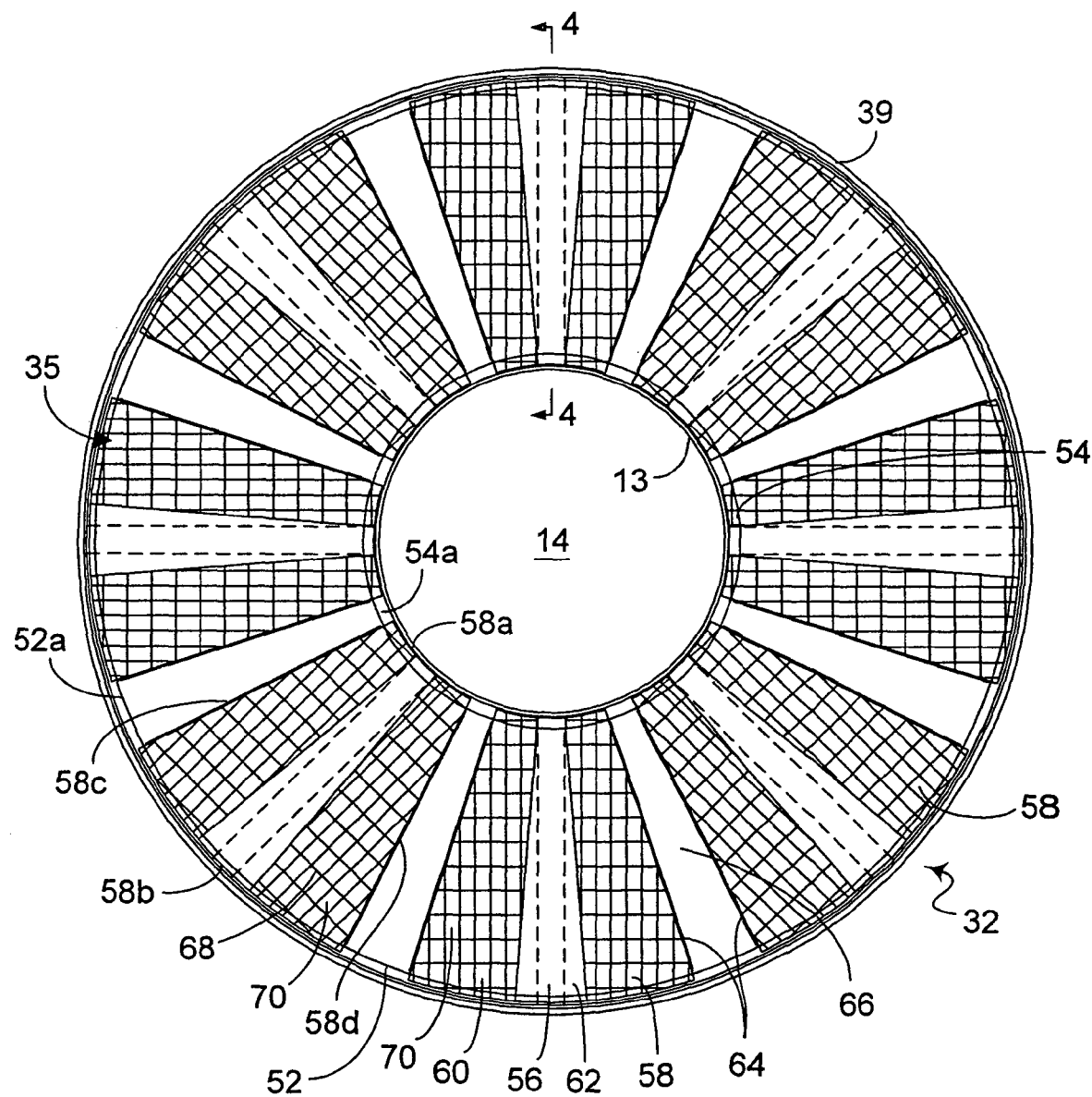
FIG. 3 is a cross-sectional view taken from segment 3—3 in FIG. 2.

FIG. 3 is a cross-sectional view of FIG. 2 taken from segment 3—3. FIG. 3 shows the riser 14 and eight baffle sectors 58 that comprise the baffle 35. Each baffle sector 58 has an inner circumferential edge 58a, an outer circumferential edge 58b and radial edges 58c, 58d. The inner circumferential edge 58a rests on a top ledge 54a of the inner circumferential band 54, and the outer circumferential edge 58b rests on a top ledge 52a of the outer circumferential band 52. The inner circumferential edge 58a defines an arch that is shorter than the arch defined by the outer circumferential edge 58b. The imperforate section 62 covers the spoke 56, shown in phantom, which supports the respective circumferential band 52, 54 that is not fastened to a respective wall 39, 13. Opposed radial edges 58c, 58d of the adjacent baffle sector 58 constrain the downcomer sections 66. Hence, the perforated sections 60 are between the downcomer sections 66 in an embodiment. Moreover, in an embodiment, the imperforate section 62 is between two perforated sections 60 and two downcomer sections 66. The skirt walls 64 may extend downwardly from the radial edges 58c and 58d of each baffle sector 58 but only between the inner circumferential band 54 and the outer circumferential band 52. In an embodiment, each baffle sector 58, each imperforate section 62 and/or each downcomer section 66 radiate from the center of the stripping section 32. In an embodiment, opposed lateral edges of each baffle sector 58, each imperforate section 62 and each downcomer section 66 are closer together toward the center of the stripping section 32 than they are at the periphery of the stripping section 32 to be nonparallel.

When catalyst falls from the downcomer section 66 of a superjacent baffle 35, it impacts the imperforate section 62 and spreads angularly and horizontally toward the downcomer sections 66. In such an embodiment with eight baffle sections, each with an imperforate section 62 between two downcomer sections 66, catalyst falling from a superjacent baffle 35 will be horizontally spread, generally in 16 angular directions.

The perforated section 60 may include numerous openings drilled into a plate. An embodiment of this invention is the distribution of the baffle openings over the entire area of the perforated section 60 of the baffles 35. The spacing of the perforations over the perforated section 60 may be arranged in any manner that eliminates wide bands or areas that do not contain holes for delivery of the fluidization medium. The hole distribution beneficial to this invention can be described by a maximum circular area that contains at least one opening. Generally, any circular area of at least 0.09 m$^2$ (1 ft$^2$) preferably surrounds at least a portion of one or more openings in that area. The circular area that can be circumscribed without enclosing a hole preferably should not exceed 0.05 m$^2$ (0.5 ft$^2$). Following this type of criteria for the minimum geometry of an area that must contain a perforation will facilitate sufficient fluidization.

In an embodiment, the perforated section 60 may comprise a grating 68 defining openings 70 as shown in FIG. 3. The grating 68 may comprise a grid of elongated strips intersecting each other through major sides of each of the elongated strips. In another embodiment, the grating 68 may comprise a series of elongated strips running in parallel with a series of parallel or patterned rods resting on top of the elongated strips. One of ordinary skill in the art will be well acquainted with several ways of making the perforated section 60. However, in an embodiment, the openings in the perforated section 60 should be large enough to allow the passage of substantial quantities of catalyst therethrough. This is most easily accomplished with the perforated section 60 comprising the grating 68. The term "substantial quantities of catalyst" means at least 20 wt-% of the catalyst descends downwardly through the openings 70 in each baffle 35. It is estimated that, typically, as much as 60 wt-% of the catalyst will descend through the openings of each baffle 35 that includes the grating 68 for the perforated section 60. The remainder of the catalyst will descend through the downcomer sections 66 of each baffle 35. In an embodiment, at least 35% of the area of the perforated section 60 comprises openings large enough to allow the passage of catalyst particles and stripping medium therethrough and small enough to diminish formation of large gas bubbles underneath the baffle 35. In an embodiment, the stripping fluid phase should ascend through the openings without significant hindrance. As such, the velocity of stripping fluid through the openings should be no more than 0.15 m/s (0.5 ft/s). An opening dimension of 1.0 to 1.3 cm (0.375 to 0.5 inch) will be suitable. Moreover, steam velocities of 0.015 to 0.6 m/s (0.05 to 2 ft/s) and steam rates of 0.5 to 3.0 kg steam/kg catalyst (0.5 to 3.0 lb steam/lb catalyst) will be suitable for the present invention.

The imperforate section 62 may comprises a blank-off plate which in an embodiment rests on top of the perforated section 60 of the baffle 35. The blank-off plate comprising the imperforate section 62 may be secured to the perforated section 60. The blank-off plate may rest flat on the perforated section 60 and may comprise an inclined upper surface or two inclined upper surfaces for directing catalyst and drainage.

In an embodiment, the cross-section of the stripping section 32 and each baffle is divided into eight baffle sectors 58 of equal area. Each baffle sector 58 may comprise 36° of partially open baffle area comprising the perforated and imperforate sections 60, 62 and 9° of completely open downcomer section 66. In an embodiment, the imperforate section 62 comprises 9° and the perforated section 60 comprises 27° of each baffle sector 58.

Figure 4:
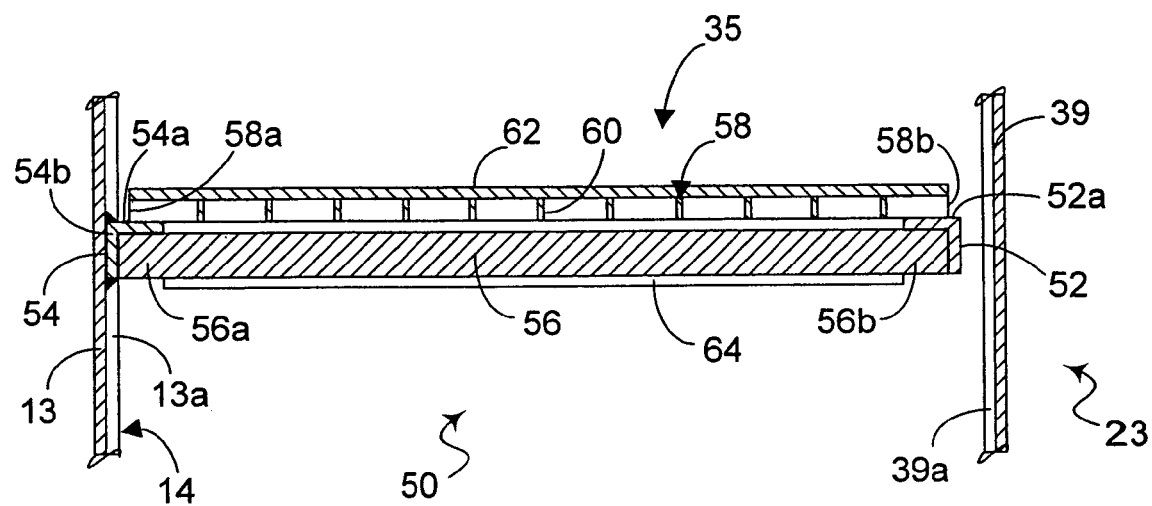
FIG. 4 is a partial cross-sectional, elevational view taken along segment of 4—4 in FIG. 3.

FIG. 4 shows a cross-section of the cantilevered support structure 50. The inner circumferential band 54 is welded to the outer wall 13 of the riser 14 with an optional refractory lining 13*a* on an outer surface thereof. The inner circumferential band 54 may comprise an angle iron having the top ledge 54*a* and a vertical member 54*b* that is secured such as by welding to the outer wall 13 of the riser 14. An inner end 56*a* of the spoke 56 is secured such as by welding to the inner circumferential band 54. An outer end 56*b* of the spoke 56 is secured such as by welding to the outer circumferential band 52. The outer circumferential band 52 is spaced apart from the wall 39 of the disengaging vessel 23. A refractory lining 39*a* may be adhered to an inner surface of the wall 39 of the disengaging vessel 23. The refractory linings 13*a*, 39*a* are not shown in FIGS. 1–3 which show less detail. The whole support structure is supported by the inner circumferential band 54 fastened to the outer wall 13 of the riser 14 and the spoke 56 secured to the inner circumferential band 54. The configuration can be reversed, such as having the outer circumferential band 52 secured such as by welding to the wall 39 of the disengaging vessel 23 and having the inner circumferential band 54 spaced apart from the outer wall 13 of the riser 14 to allow for thermal expansion. The circumferential band 52, 54 that is not fastened to the wall need not be an angle iron but may just comprise a ring having a horizontal surface secured such as by welding to the top of the spoke 56. The inner circumferential edge 58*a* of the baffle sector 58 rests upon and is secured to the top ledge 54*a* of the inner circumferential band 54 and the outer circumferential edge 58*b* of the baffle sector 58 rests upon and is secured to the top ledge 52*a* of the outer circumferential band 52. The imperforate section 62 rests upon and is secured to the perforated section 60 of the baffle sector 58. The skirt wall 64 may depend below the spoke 56.

The cantilevered support structure 50 provides ease of installation and of maintenance. The baffle sector 58 can be removed from the cantilevered support structure 50 for maintenance without breaking a weld between the baffle sector 58 and the wall 13 or the wall 39. Moreover, if maintenance of the support structure 50 requires removal, the weld between the support structure 50 and only one wall, in this case, wall 13, need be broken. The cantilevered support structure 50 further allows for both differential radial expansion by the spacing of the cantilevered support structure 50 from the wall to which it is not attached and for differential axial expansion by being attached only to one of the walls 13 or 39.

In another embodiment, instead of using the spokes 56 to support the baffles, the inner and outer edges of the skirt walls 64 may be secured to the outer circumferential band 52 and the inner circumferential band 54, respectively. Either the outer circumferential band 52 or the inner circumferential band 54 would then be secured to a respective one of the wall 39 and the wall 13 of the riser 14. In another embodiment, the baffle configuration supported by the skirt walls 64 can be provided in a stripping vessel that includes no internal riser 14. In this embodiment, one end of each skirt wall 64 would be fastened to the outer circumferential band 52 and the other end would be allowed to move with respect to the outer circumferential band 52. Other cantilevered support structures may also be acceptable. For example, the spokes 56 may have one end secured to a wall, the other end spaced from the near wall and the baffle sector 58 of the baffle 35 resting directly on the spokes 56. The circumferential bands 52, 54 would be obviated.

In an embodiment, the baffles are typically formed from alloy steels that will stand up to the high temperature conditions in the reaction zone. Such steels are often subject to erosion and the baffles may benefit from the use of inserts or nozzles to define the openings and provide resistance to the erosive conditions imposed by the circulation of catalyst over the top of the baffle. Furthermore, the baffles are routinely covered with a refractory material that provides additional erosion resistance. Details of abrasion-resistant nozzles and refractory linings are well known to those skilled in the art of particle transport.

What is claimed is:

1. An apparatus for the stripping of hydrocarbons from particulate material, said apparatus comprising:
   a stripping vessel;
   at least one port defined by the stripping vessel for receiving particles that contain hydrocarbons and for withdrawing stripping fluid and stripped hydrocarbons from the stripping vessel;
   a plurality of stripping baffles spaced apart vertically over at least a portion of the stripping vessel, one of said plurality of baffles including at least three downcomers radially extending from a vertical center of said stripping vessel;
   a plurality of openings distributed over at least a portion of the surface of said one of said stripping baffles;

at least one fluid inlet for passing a stripping fluid to an underside of said one of said stripping baffles for stripping hydrocarbons from the particulate material; and at least one particle outlet for recovering stripped particles from the stripping baffles.

2. The apparatus of claim 1 wherein said plurality of openings are sufficiently large to allow the passage of catalyst therethrough.

3. The apparatus of claim 1 wherein said one of said stripping baffles is horizontal.

4. The apparatus of claim 1 wherein said one baffle further comprises an imperforate section and a perforate section, said perforate section including said plurality of openings.

5. The apparatus of claim 4 wherein said imperforate section is disposed between two of said downcomers.

6. The apparatus of claim 5 wherein said perforate section is disposed between said downcomer and said imperforate section.

7. The apparatus of claim 1 wherein one of said at least three downcomers is constrained by nonparallel, opposing sides.

8. The apparatus of claim 1 wherein stripping baffle comprises a grate.

9. The apparatus of claim 1 incorporated into an FCC unit.

10. An apparatus for the stripping of hydrocarbons from particulate material, said apparatus comprising:

a stripping vessel;

a conduit extending through said stripping vessel;

at least one port defined by the stripping vessel for receiving particles that contain hydrocarbons and for withdrawing stripping fluid and stripped hydrocarbons from the stripping vessel;

a plurality of stripping baffles spaced apart vertically over at least a portion of the stripping vessel, one of said plurality of baffles including at least three downcomers radially extending from said conduit;

a plurality of openings distributed over at least a portion of the surface of said one of said stripping baffles;

at least one fluid inlet for passing a stripping fluid to an underside of said one of said stripping baffles for stripping hydrocarbons from the particulate material; and at least one particle outlet for recovering stripped particles from the stripping baffles.

11. The apparatus of claim 10 wherein said one stripping baffle is; at least indirectly supported by said conduit.

12. The apparatus of claim 10 wherein stripping baffle comprise a grate.

13. The apparatus of claim 10 wherein said plurality of openings are sufficiently large to allow the passage of catalyst therethrough.

14. The apparatus of claim 10 wherein said one of said stripping baffles is horizontal.

15. The apparatus of claim 10 wherein said one baffle further comprises an imperforate section and a perforate section, said perforate section including said plurality of openings.

16. The apparatus of claim 15 wherein said imperforate section is disposed between two of said downcomers.

17. The apparatus of claim 16 wherein said perforate section is disposed between one of said at least three downcomers and said imperforate section.

18. The apparatus of claim 10 wherein one of said downcomers is constrained by nonparallel, opposing sides.

19. A process for stripping hydrocarbons from particulate material, said process comprising:

feeding particles containing hydrocarbons to a vessel including a plurality of vertically spaced-apart, stripping baffles, one of said plurality of baffles including a downcomer radially extending from a center of said stripping vessel, said downcomer constrained by opposed, nonparallel sides, and a plurality of openings distributed over at least a section of the surface of said one of said stripping baffles;

passing a stripping fluid to an underside of said one of said stripping baffles for stripping hydrocarbons from the particulate material;

recovering stripping fluid and stripped hydrocarbons from said vessel; and collecting stripped catalyst from said vessel.

20. The process of claim 19 wherein said one baffle comprises at least three of said downcomers.

* * * * *